US008428592B2

(12) United States Patent
Lundqvist et al.

(10) Patent No.: US 8,428,592 B2
(45) Date of Patent: Apr. 23, 2013

(54) METHOD AND APPARATUS FOR DETERMINING A SERVER WHICH SHOULD RESPOND TO A SERVICE REQUEST

(75) Inventors: Henrik Lundqvist, Munich (DE); Zoran Despotovic, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/359,699

(22) Filed: Jan. 27, 2012

(65) Prior Publication Data

US 2012/0196601 A1    Aug. 2, 2012

(30) Foreign Application Priority Data

Jan. 28, 2011 (EP) .................................... 11152469

(51) Int. Cl.
 *H04W 4/00* (2009.01)
(52) U.S. Cl.
 USPC .................. 455/435.2; 455/404.2; 455/435.1; 455/432.1
(58) Field of Classification Search ............... 455/404.2, 455/435.2, 435.1, 432.1
 See application file for complete search history.

(56) References Cited

U.S. PATENT DOCUMENTS

| 6,614,774 | B1 * | 9/2003 | Wang ............................ 370/338 |
| 2005/0124382 | A1 * | 6/2005 | Britt et al. .................. 455/556.2 |
| 2010/0210251 | A1 * | 8/2010 | Shaw et al. ................ 455/414.1 |
| 2010/0306386 | A1 | 12/2010 | Speicher et al. | |

OTHER PUBLICATIONS

Extended European Search Report for European Application No. 11152469.0, dated Jun. 28, 2011, 5 pages.

* cited by examiner

*Primary Examiner* — Kwasi Karikari
(74) *Attorney, Agent, or Firm* — Brinks Hofer Gilson & Lione

(57) ABSTRACT

A method for determining a server which should respond to a service request from a mobile device, said method comprising: Generating a DNS request which comprises a URI to identify a service requested by said mobile device and in addition to the URI of the requested service an indication of the location of the mobile device; inserting into said DNS request a keyword, which identifies said service DNS request as being a service which is enabled for service migration; forwarding said DNS request to a DNS server; determining by said DNS server a most suitable server responding to said service request, said determination being based on the location of the mobile device as indicated by said indication of the location added to said URI; returning the address of said server which has been determined based on said location to said mobile device.

13 Claims, 7 Drawing Sheets

| Service capabilities | MCC/MNC | Cell-Id /location | Server Control | Status | Server Address |
|---|---|---|---|---|---|
| 100100 | 240/00,01; 244/00,05; | 240/00,01:[1-100] | TeliaSonera | Negotiation | 128.32.12.1 |
| 110011 | 262/00,02; 208/05,06; 222/01,02; 206/07,08 | Not Applicable | Alcatel-Lucent | Negotiation | 131.21.2.32 |
| 111111 | 222/01,02; 202/04,05; 208/00 | All | Docomo | Available, low load | 164.23.3.41 |
| ...... | | | | | |
| 000101 | | | Amazon | Available | |

Fig. 4

METHOD AND APPARATUS FOR DETERMINING A SERVER WHICH SHOULD RESPOND TO A SERVICE REQUEST

RELATED APPLICATIONS

This application claims priority under 35 U.S.C. §119 to European Patent Application No. 11152469.0 filed on Jan. 28, 2011, the entire content of which is hereby incorporated by reference.

BACKGROUND OF THE INVENTION

1. Field of the Invention

The present invention relates to a method for determining a server which should respond to a service request. It can be applied for name resolution and dynamic access to services based on the location of the user.

2. Description of the Related Art

When a mobile device of a user connects to a service it first needs to find the address the node that provides the service. For services accessed over the Internet this is typically solved by DNS (Domain Name System) which translates domain names meaningful to humans into numerical identifiers associated with networking equipment or services for the purpose of locating and addressing these devices or services worldwide. The process of identifying the numerical address (IP address) of a network entity which corresponds to a DNS request is called DNS resolution. Also IMS (IP Multimedia Subsystems) often use DNS to find the server addresses.

When the mobile device which requests the service is connected to a visited network and not to the home network there usually is made a connection to the service run in the home network. This has disadvantages, in increases the costs due to the roaming and needs more network services than would be necessary if the service could be run in the visited network. It would therefore be desirable to enable service migration to the visited network in such a case, or at least to provide services closer to a roaming user even if service migration is not supported.

If the service can be provided from multiple locations a method would be desirable that can provide the address of the most appropriate service for the specific user. This depends on factors such as the user location and the server loads. Hence, when DNS is used to provide the address of the server it needs information about the location of the user to determine which server it should direct the user to.

If the DNS server can be provided with information about the location it can also be enhanced with procedures to determine the best server and provide the address of that server. Strictly speaking this would not be a normal DNS server; it could rather be seen as a different DDDS (Dynamic Delegation Discovery System) application, since a normal DNS server does not have the intelligence to choose the best server based on the user location.

In the 3GPP standards for the EPC the selection mechanisms for S-GW and P-GW are based on DNS (see 3GPP Technical Specification 29.303, Domain Name System Procedures, Stage 3 (Release 9)). These use the DNS server in the MME which uses information about the UE location, e.g. the TAI or cell-ID, to the DNS request. The mechanisms are based on Dynamic Delegation Discovery System (DDDS) (see M. Mealling, "Dynamic Delegation Discovery System (DDDS) Part One: The Comprehensive DDDS", IETF RFC 3401, October 2002), which allows lazy binding to be implemented for DNS. This is limited to selection of these specific servers and requires these mechanisms to be implemented in the MME. It would, however, be desirable to enable that the DNS is used to direct any SPM (service program mobility) enabled service to an arbitrary server that may be located outside of the mobile network. Moreover, it would be desirable that no special support from the visited network is required which simplifies deployment of SPM.

Content delivery networks such as Akamai use DNS to direct the user to the best located server based on the location of the user (see Mukaddim Pathan and Rajkumar Buyya, "A Taxonomy of CDNs", Content Delivery Networks, R. Buyya, M. Pathan, and A. Vakali (Eds.), Springer-Verlag, Germany, 2008.) However, the Akamai system is based on using a large number of DNS-servers and measuring the location of the user by estimating the delays between the user and different servers. A more simple and easy to implement approach would be desirable.

SUMMARY OF THE INVENTION

According to one embodiment there is provided a method for determining a server which should respond to a service request from a mobile device, said method comprising:

Generating a DNS request which comprises a URI to identify a service requested by said mobile device and in addition to the URI of the requested service an indication of the location of the mobile device;

forwarding said DNS request to a DNS server;

determining by said DNS server a most suitable server responding to said service request, said determination being based on the location of the mobile device as indicated by said indication of the location added to said URI;

returning the address of said server which has been determined based on said location to said mobile device.

This enables the selection of a server which is most suitable depending on the location of the mobile device which requested the service.

According to one embodiment said indication of said location is based on information being broadcast by the radio interface of the mobile network, and/or said indication of the location of the mobile device comprises the mobile country code MCC and/or the mobile network code MNC of the network and/or the cell-ID to which said mobile device is currently connected.

This enables the mobile device to obtain the location information which it can then insert into the service request.

According to one embodiment based on said location indication there is chosen a server among a plurality of possible servers on which said service is running which is closer to said mobile device than other among said plurality of servers, and/or wherein based on said location indication there is chosen a server among a plurality of possible servers on which said service is running or can be run which is located in the visited network to which said mobile device is connected and not in the home network of said mobile device.

Choosing a close server enhances the connection quality and may reduce costs. The latter is also the case if the roaming from the visited network to the home network can be avoided.

According to one embodiment said indication of said location of the mobile device is obtained by said mobile device and inserted into said DNS request, or said indication of said location of the mobile device is obtained by or from some entity of the network which is aware of the indication of the location of said mobile device.

Obtaining the location by the mobile device is convenient because then the source of the request can directly enter the location information. Alternatively, if this is not possible for some reason, it may even be entered at a later stage by obtaining it from a different entity.

According to one embodiment said location information is obtained by a DNS server in the network to which said mobile device is directly connected by referring to a network entity which is aware of such information, preferably the MME and/or the HSS of an 3GPP SAE network, or the corresponding entities in other network standards for example HLR and/or VLR.

This is a way of obtaining the location information at a later stage, preferably by the first DNS server in the network to which the mobile device is connected.

According to one embodiment said indication of the location of said mobile device is included into said DNS request as one or more subdomains of said URI identifying the requested service.

This is a particularly efficient and convenient way of including this information in a way such that it does not disturb normal DNS operations while enabling the redirection based on location information.

According to one embodiment the method further comprises:

Inserting into said DNS request a keyword, which identifies said service DNS request as being a service which is enabled for service migration or which identifies said service DNS request as a service for which a direction of the service DNS request to a server based on the location of the mobile device should be performed.

This enables the distinction between a "normal" or conventional DNS request and a DNS request for which a redirection based on location information should be attempted.

According to one embodiment the method further comprises:

Using a server database which stores information about which server to be used depending on the location of said mobile device; and/or taking into account the loads of the available servers in addition to their location when determining the most suitable server.

In this manner the most suitable server can be determined by looking up the database based on the location information.

According to one embodiment the method further comprises:

Checking by a DNS server whether the DNS service request comprises a keyword or a code which identifies it as a DNS service request for which a direction based on the location of the mobile device should be attempted;

if it is determined that direction based on the location of the mobile device should be attempted, determining a suitable server which is selected based on the location of the mobile device;

returning the address of the determined server to said mobile device.

This enables a redirection processing if requested (based on the keyword) while ensuring backward compatibility with conventional DNS service requests.

According to one embodiment the method further comprises:

if said mobile device is in a visited network, forwarding said DNS request to the home network of said mobile device;

negotiating between said home network and said visited network to enable service migration from a home network server to run said service on a server in said visited network;

if said negotiation was successful, returning the address of the server in said visited network on which said requested service is running to said mobile device.

In this manner a DNS request which contains location information may trigger service migration.

According to one embodiment the method further comprises:

if said mobile device is in a visited network, determining by the DNS server of said visited network whether the service can be run on a server in said visited network;

if necessary, negotiating between said visited network and the home network of said mobile device the conditions for running the service in said visited network;

if the service can be run on a server in said visited network, returning the address of said server to said mobile device.

In this way the normal DNS processing can be circumvented by "intercepting" the DNS request by the DNS server in the visited network and trying to run the service in the visited network.

According to one embodiment there is provided an apparatus for determining a server which should respond to a service request from a mobile device, said apparatus comprising:

A module for generating a DNS request which comprises a URI to identify a service requested by said mobile device and in addition to the URI of the requested service an indication of the location of the mobile device;

a module for forwarding said DNS request to a DNS server;

a module for determining by said DNS server a most suitable server responding to said service request, said determination being based on the location of the mobile device as indicated by said indication of the location added to said URI;

a module for returning the address of said server which has been determined based on said location to said mobile device.

In this way an apparatus (or system) implementing an embodiment of the invention may be provided.

According to one embodiment there is provided an apparatus comprising a mobile device for operating with an apparatus according to an embodiment of the invention, comprising:

a module for determining an indication of the location of said mobile device, preferably based on information broadcasted by the network to which the mobile device is connected;

a module generating a DNS request which comprises a URI to identify a service to be requested by said mobile device and in addition to the URI of the requested service an indication of the location of the mobile device.

In this way a mobile device according to an embodiment of the invention may be implemented.

According to one embodiment there is provided an apparatus comprising a DNS server in a network for operating with an apparatus according to an embodiment of the invention, comprising:

A module for receiving from a mobile device a DNS request which comprises a URI to identify a service to be requested by said mobile device and in addition to the URI of the requested service an indication of the location of the mobile device;

a module for determining a server based on the location of said mobile device, and a module for returning the address of said server which has been determined based on said location to said mobile device.

In this way a DNS server according to an embodiment of the invention may be implemented.

The apparatus according may further comprise one or more modules module for performing the steps or implementing the features as defined in one of the methods according to embodiments of the invention.

BRIEF DESCRIPTION OF THE DRAWINGS

FIG. 4 schematically illustrates a database server according to a further embodiment of the invention.

DETAILED DESCRIPTION OF PREFERRED EMBODIMENTS

Figure 1:
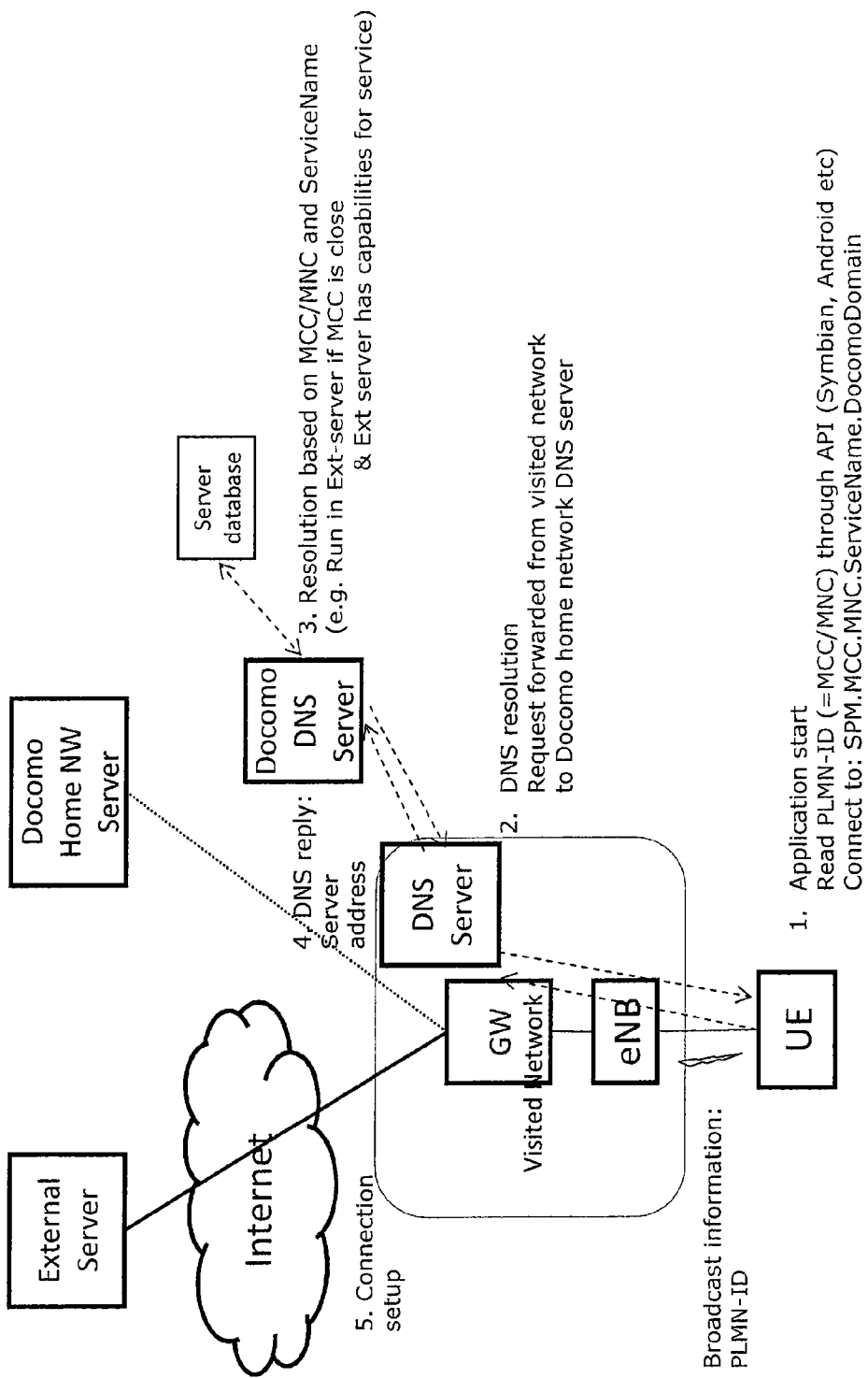
FIG. 1 schematically illustrates a redirection method according to an embodiment of the invention.

According to one embodiment there is proposed a solution which allows a fast migration path to implement SPM (service program mobility) enabled applications in current networks. Service Program Mobility is a novel paradigm for global service provisioning. The system architecture according to one embodiment realizes dynamic service component migration across operator domains and platform to offer the same experience to roaming users as they would have in the home network.

There is provided a mechanism to inform a DNS server about the location of a user and an enhancement of the DNS server to use this information to decide which server address to return to the client.

Such a mechanism can be implemented as an application for smart phones and work in visited networks that do not have any support for SPM.

The most straightforward way for a DNS server to estimate the location of the user is to use the IP-address the request is arriving from. This approach, however, has some disadvantages. If the DNS request is coming from an intermediary DNS server it will be the address of the intermediary server that is visible.

One advantage of embodiments of the invention compared to using IP-addresses is that they avoid dependencies on the configuration of IP-addresses in the visited network. This can be achieved by adding an indication of the location of the mobile device, e.g. based on mobile network codes. The mobile network codes are more stable and therefore reduce the required operational efforts. A second advantage is that the proposed approach in one embodiment lets the DNS server support requests also through other paths than direct queries from the visited network. In particular this is useful for IMS, where the requests would come from the S-CSCF in the home network.

According to one embodiment there is provided a method for enhancing DNS such that it can direct a user request to the best available server based on information about the user location.

For that purpose there is generated a DNS request which comprises a URI to identify a service requested by a mobile device and in addition to the URI of the requested service the DNS request comprises an indication of the location of the mobile device. The DNS request then is forwarding to a DNS server; and then there is determined by the DNS server a most suitable server responding to said service request, the determination being based on the location as indicated by said indication of the location added to said URI. Then the address of said determined server is returned to the mobile device.

The indication of the location of the mobile device in one embodiment comprises the mobile country code MCC and/or the mobile network code MNC of the network and/or the cell-ID to which said mobile device is currently connected. Based on the location indication there is then chosen a server among a plurality of possible servers on which said service is running which is closer to said mobile device than other among said plurality of servers.

In one embodiment the system consists of two main new components: one software component in the UE (mobile device) which takes broadcast information from the radio interface of the mobile network (such as the mobile country code MCC and/or the mobile network code MNC of the network and/or the cell-ID) and adds this to the URI before the DNS-resolution and a modified DNS (or DDDS) server which determines which server address to return based on the location of the user. The DNS server in specific embodiments may also use additional information such as the availability of software components at servers, the current load of different candidate servers and negotiation results from external service providers. According to one embodiment which takes the loads of the available servers into account, if for example the most preferably server in terms of location has a load which exceeds a certain threshold, then the next preferable one in terms of location may be chosen if this server has an acceptable load.

The proposed approach works without support from visited network operator, hence allows rapid deployment of SPM without the need to wait for all operators to deploy it. In fact, the service enablers can be provided by any other entity, e.g. cloud computing providers, vendors, or an operator overseas data center. This also enables a possible approach to avoid incompatibility problems with service enablers from different vendors, since the enablers may be provided by external parties such as the vendors themselves.

Compared to using only IP-address of the requesting client or DNS server to derive the user location the following advantages are achieved:

More accurate location information allows placement optimization in home network Robust against users that use other DNS servers (e.g. Google DNS-server 8.8.8.8).

In the following further embodiments will be described in somewhat more detail. For that purpose, first of all also the DNS technology is somewhat further explained.

DNS is widely used to provide server addresses in the Internet. Therefore, it is also used as a tool for optimizing service routing for example in content delivery networks. The mobile network operators usually provide their own DNS servers which may be used to direct the clients to the most appropriate server. This can be utilized in many different scenarios where DNS is used for service discovery. For example, the S-CSCF may use DNS to request the location of a specific service component. However, to provide a client-specific reply the DNS server must be provided with sufficient information. Since a basic DNS-request only includes the IP-address of the requesting client, or proxy, it is required to provide additional information in the request itself, otherwise it will be based on the location of the server. Moreover, MCC and MNC are very stable, while IP-addresses may be reassigned which would require more operational effort to be able to map IP-addresses to networks or locations compared to using MCC/MNC.

Therefore the solution according to one embodiment is that information about the UE location, and preferably also service specifics, is included in the DNS request to provide the DNS-server with sufficient information. This is e.g. possible by using the cell and network information which is broadcasted over the air interface. The drawback of this way of providing information is that it requires a change in the DNS requests, to add this information. Most smartphone operating systems and devices, however, provide the required interfaces so that this can be implemented by SPM enabled applications. The deployment model for SPM services for smartphones can therefore be to provide libraries that implement SPM specific functionality which the application developers may use. However, for existing applications and more limited operating systems it may not be straightforward to support this redirection method, therefore there will in the following be also described one embodiment how the solution can be applied for this case.

When a client requests a new service directly from a server the redirection can be handled by DNS (or by the responsible DNS server). In this section when referring to the DNS server there is meant an enhanced server which serves as or provides a redirection function. First there is considered the case where the DNS request includes the location information of the UE added to the domain name. In this case the DNS server, using DDDS methods, can directly use the location information to choose the server to direct the user to using additional information from a server database. The DNS server will then respond with the right IP-address and the client can connect to the server. This is illustrated in FIG. 1. The operation shown in FIG. 1 will now be briefly explained.

FIG. 1 shows an embodiment where redirection is carried out without support from the visited network.

UE is connected to a visited network when the application starts. In step 1) the PLMN-ID which consists of a mobile country code component (MCC) and a mobile network code component (MNC) is read through the API of the mobile phone OS (e.g. Symbian, Andriod, etc.). This is an indication of the location of the mobile device and is used to generate a modified DNS request in the form SPM.MCC.MNC.Servicename.DocomoDomain. Here the service "ServiceName" is offered under the domain of the mobile operator Docomo (therefore domain "ServiceName" as subdomain of Docomodomain), the MNC and MCC form indications of the locations of the UE by two subdomains, and the (lowest level) subdomain SPM indicates that the service request might be supported by a SPM enabled network (which is not the case in this embodiment).

In step 2) the DNS resolution is performed and the request is forwarded from the visited network to the (Docomo) home network DNS server.

In step 3) the resolution is performed based on the MCC/MNC and the name of the service (ServiceName). For that purpose reference can be made to a server database where there is stored a list of (external) servers which are suitable depending on the location of the UE. If there is found (by looking up the database) that there is a suitable external server (external to the home network), and if the server has the necessary capabilities for service, then in step 4) there is sent back a DNS reply which contains the address of this server. In this way an address of an external server which is more close to the UE than a server in the home network (here the Docomo network) and/or which does not make roaming necessary can be determined and returned to the UE.

Then in step 5) the UE may set up a connection to this external server through the internet.

If the service includes multiple servers which the client needs to connect to, multiple DNS requests will be made. If the application server need to connect to additional servers it will make DNS requests to find the right server to attach to. If this second server need to be chosen based on the client identity or the UE location this information has to be provided to the server. This should typically happen within the application. An alternative would be to use the mobile network entities to provide the required information.

Another aspect that should be considered for DNS redirection is who controls the authoritative DNS server for the domain name. Typically this will be the service provider, which may or may not be the home network provider. The most important case is when the home network provider is also the service provider. If SPM enabled services should also be supported for services that are not provided by the home network operator (at least as an intermediary) the DNS resolution request may be directed to the DNS server of the home network operator.

If the client is roaming one may assume that the DNS server of the visited network will receive the request (this assumption may not be true if all data traffic is routed through the home network. However, in that case there is no gain from deploying SPM). The DNS query will be forwarded to the authoritative DNS server, which will determine where to place the service. One complication that could occur is that the DNS server in the visited network caches the replies to DNS requests and place identical requests in the same server as the previous requests. This would be problematic since it would not give the home network the opportunity to change the placement based on the request count for the service. Therefore, caching of DNS replies preferably should be minimized, which may be achievable by providing preferences in the reply.

One aspect of the DNS based redirection is that it can be deployed without cooperation of the visited network. This means that the services cannot be placed in the visited network, but at a suitable location close to the user. FIG. 1 shows such a scenario. The visited network is not required to do perform any SPM specific operations, it only needs to perform standard DNS resolution. As will be apparent for the skilled person, the networks have to support local breakout of the data traffic rather than routing it back to the home network for the scenario to work.

Figure 2:
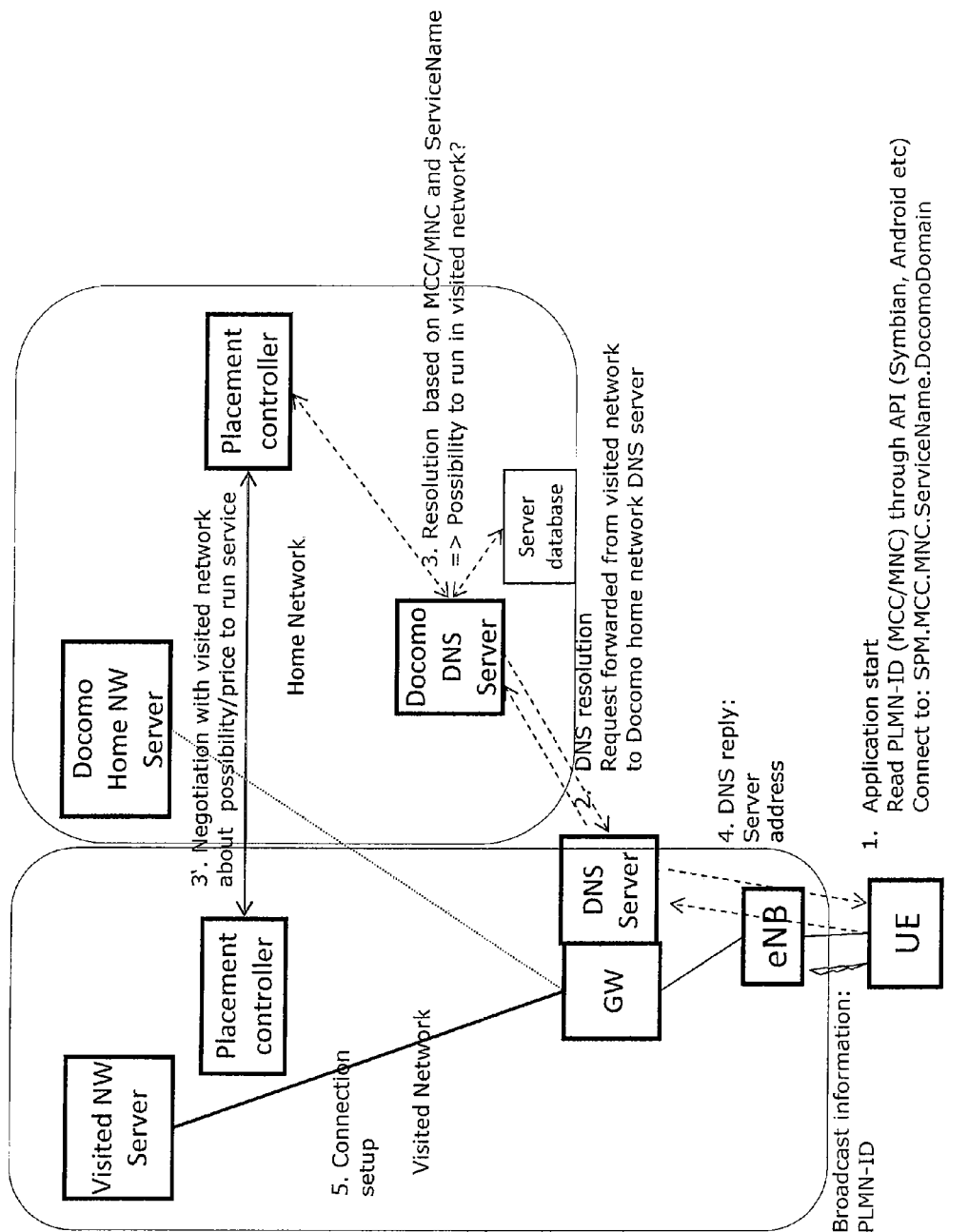
FIG. 2 schematically illustrates a redirection method according to a further embodiment of the invention.

FIG. 2 shows an embodiment in which the visited network also supports SPM. It may be regarded as a modification of the procedure of FIG. 1 for the case where the visited network also supports SPM. It shows how the procedure can be used in multiple scenarios and supports a gradual deployment of SPM.

In this case there may be a need to decide whether to move a service to the visited network or run it in the home network and to initiate additional procedures to migrate the service to the visited network. Therefore there is included an additional function which is referred to as placement controllers in the home and the visited networks. These controllers may negotiate about placing the service in the visited network. The need for these functionalities depends on the details of how SPM is concretely implemented, for example whether services can always be executed in the visited networks and also whether service components are already available there or not.

The process illustrated in FIG. 2 will now be briefly explained, in particular by explaining the differences with the process shown in FIG. 1.

After including the location indication in the DNS request in step 1) a DNS resolution is performed by the DNS server of the visited network. The DNS request is forwarded to the home network. If the service which is requested has already migrated (which may depend on the network and the implementation) then the request may be directly handled inside the visited network. This case will be explained later in connection with another embodiment.

In step 3) the DNS request is resolved and the possibility to run the service in the visited network will be checked, possibly by referring to a server database.

In step 3' the placement controller of the home network negotiates with the placement controller of the visited network about the possibility to run the server in the visited network. This may include negotiations about the price to run the service in the visited network. Again, this step may not be needed if the service is available in the visited network.

In step 4) then the server address is returned as DNS reply, and in step 5) the connection between the UE and this server (visited NW server) is then set up.

Figure 3:
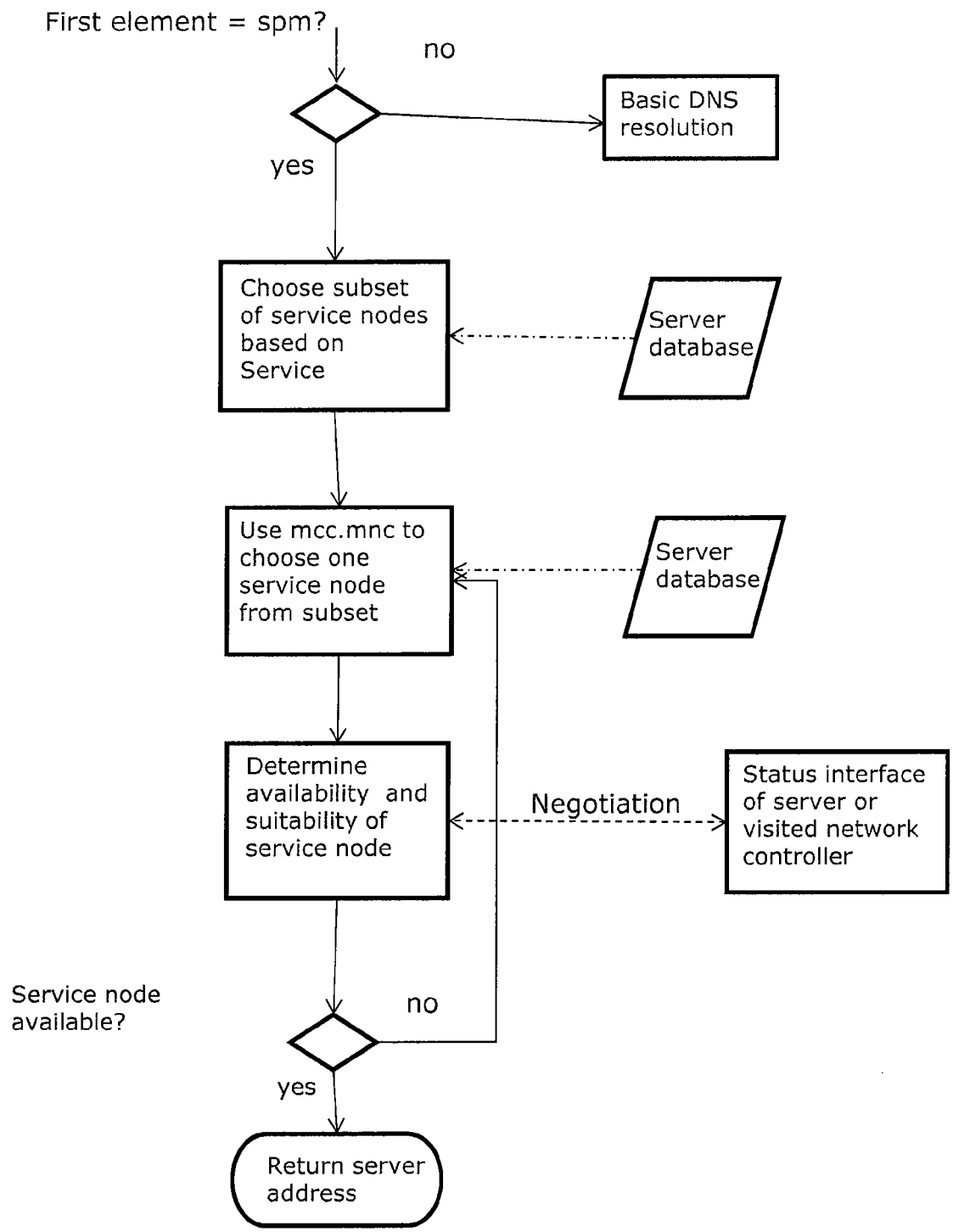
FIG. 3 schematically illustrates part of a redirection method according to a further embodiment of the invention.

The enhanced DNS server may use a lookup procedure based on the string (URI) provided in the DNS request. This procedure is illustrated in FIG. 3. After the DNS server has detected that it is a SPM-enabled service (this detection may e.g. be made from the keyword (spm) in the DNS request string as shown in the first checkbox of FIG. 3) it will narrow down the set of target servers based on the service and the MCC/MNC. The order between these two steps depends on the deployment scenario. In principle it would be attractive to narrow down the set of servers as much as possible in the first step. Hence, if the servers are typically able to serve only a small subset of the services it would be preferable to first make a choice based on the service as illustrated in FIG. 3. This could for example be the case if service enablers from a specific vendor have to be chosen. If most servers would be able to server most services it would instead be preferable to first use the MCC/MNC to narrow down the target server set.

In FIG. 3 it can also be seen that the DNS server interacts with a server database. A proposed structure for this server database is (partially) shown in FIG. 4. The server capabilities could initially be a bitmask with the length corresponding to the set of services provided by the network where each bit indicates one service. As more services are offered in the network it may be preferable to define the server capabilities in a non service specific way, for example in terms of supported APIs and hardware resources. The database may therefore be extended to include columns for both of these specification methods. The MCC/MNC information provide information about the location and which server can be used for the requested service given the location. Cell-ID/location information may be provided for some servers if the server operator has a preference of using different servers for different parts of their network. The entity controlling the server is also included (here there should also be information about how to reach the controlling organization for negotiation of server usage). Also the server address is included, although this could be provided during the negotiations in case the server is controlled by a different organization. In principle this also allows a visited network operator to provide a private IP-address since it knows the location of the UE.

According to one embodiment, if the location of the UE is not supplied with the DNS request the location can still be inferred using information from the network, i.e. the MME (Mobility Management Entity) or the HSS (Home Subscriber Server). If the DNS query is enhanced with this information at the first DNS server (in the network where it is connected) the query would look the same as if it came from the terminal with location information and it would be possible to use the same DNS procedure in the home network as described in the embodiments above. It may also be enhanced with this information by the home network DNS server, using information from the HSS about which network the UE is connected to.

The location information can be requested from the network by the enhanced DNS server as a pre-processing stage before entering the procedure described in FIG. 3. In the roaming case there may be an advantage in getting the location information from the MME since that would provide all the necessary information to the authoritative DNS server even if it was not under the control of the home network (i.e. an external service provider). Alternatively the placement controller may request the location information. The motivation for letting the placement controller request the location information would be that it is the function that will need the information.

Figure 5:
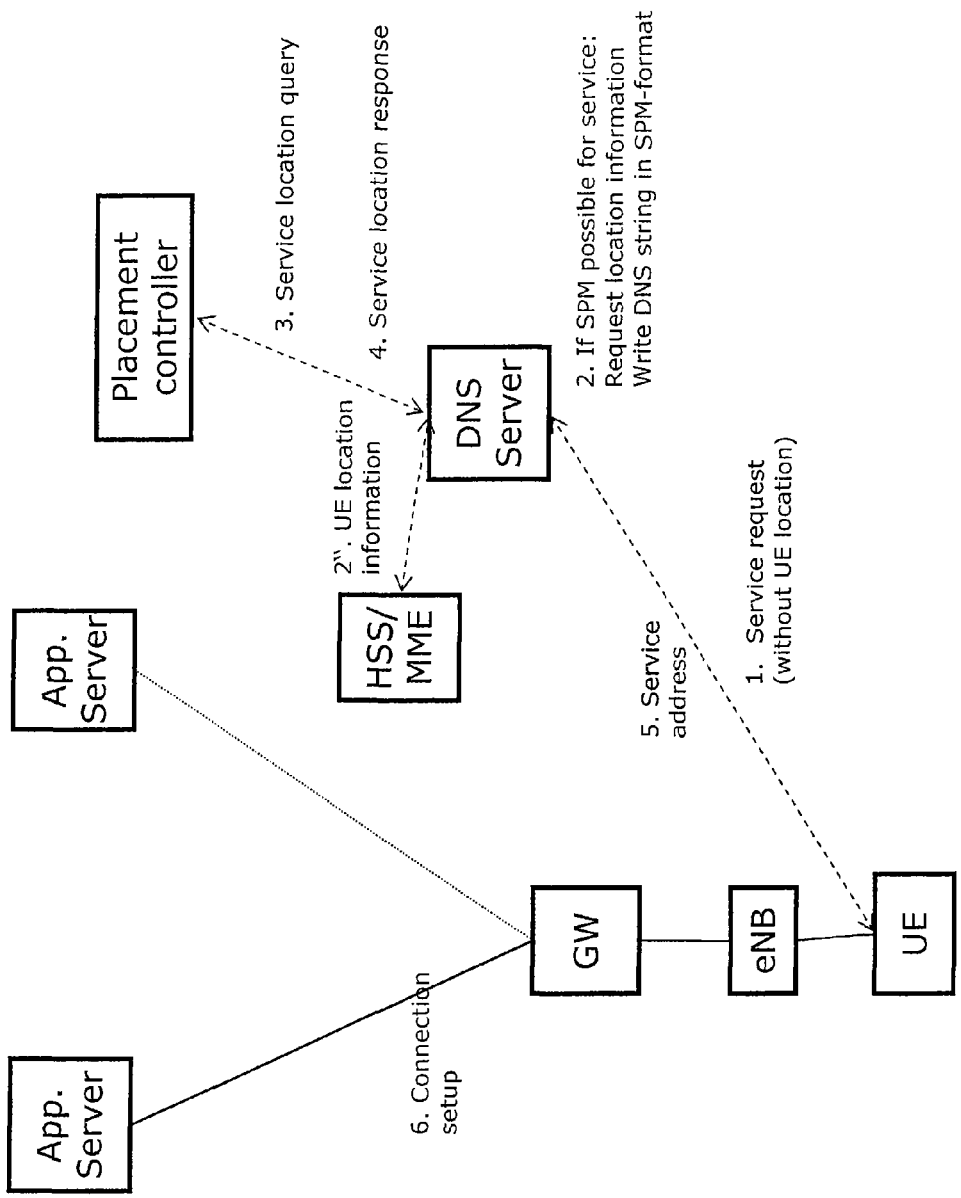
FIG. 5 schematically illustrates a redirection method according to a further embodiment of the invention.

FIG. 5 illustrates such an embodiment without SPM enabled application where location information is added in the DNS resolver.

In step 1) a service request is issued without location information. In the DNS server it is then checked whether SPM is possible for the service. In step 2' the UE location information is obtained from the MME and/or HSS.

A service location query is then forwarded to the placement controller (step 3)) which issues a corresponding response (step 4). This then corresponds to a server address/service address which is returned in step 5) by the DNS server. Then in step 6) the connection is set up to the server having the returned address.

In the following the applicability of the DNS redirection in case of IMS will be discussed. In IMS, when a service request is generated from a UE the P-CSCF contacts the S-CSCF (serving CSCF) in the home network of the user. The S-CSCF then directs the session to an application server (AS). To find the AS the S-CSCF can use DNS, which would make the DNS redirection useful also for this case. However, this would require that information about the UE location is included in the DNS-request, otherwise it would optimize the choice of server based on the IP-address of the S-CSCF. At the call setup the originating terminal may include the access network technology and the cell-id in the IMS signaling. This information can be used in the DNS lookup by adding the MCC, MNC and Cell-ID to the URI to get a location dependent response. Hence, the modification of the DNS server can also be used by IMS.

In the following the applicability of the approach to composed services will be discussed. Many services are composed of multiple components. If each of the components is connected only to the UE, the described solution is applicable for each component individually. However, the service components may also be connected internally between each other. In this case, only the components that are directly connected to the UE need to take the UE location into account. The other components only need to take into account the location of the components they are interconnected with. The latter problem only requires information about the static locations of different servers and is therefore independent of the problem how to take into account the (dynamic) location of a UE.

In the following there will be described an embodiment with an optional extension in the case when the visited network operator supports SPM. In this embodiment the DNS server of the visited network is configured to detect the SPM enabled services which it can run in its own network. It can then initiate a negotiation with the home network to make an offer to run the service in its network. This would also work if the service provider is not a mobile network operator. Hence, the mobile operator could dynamically offer its service delivery platform to external service providers, e.g. to generate additional revenues.

Figure 6:
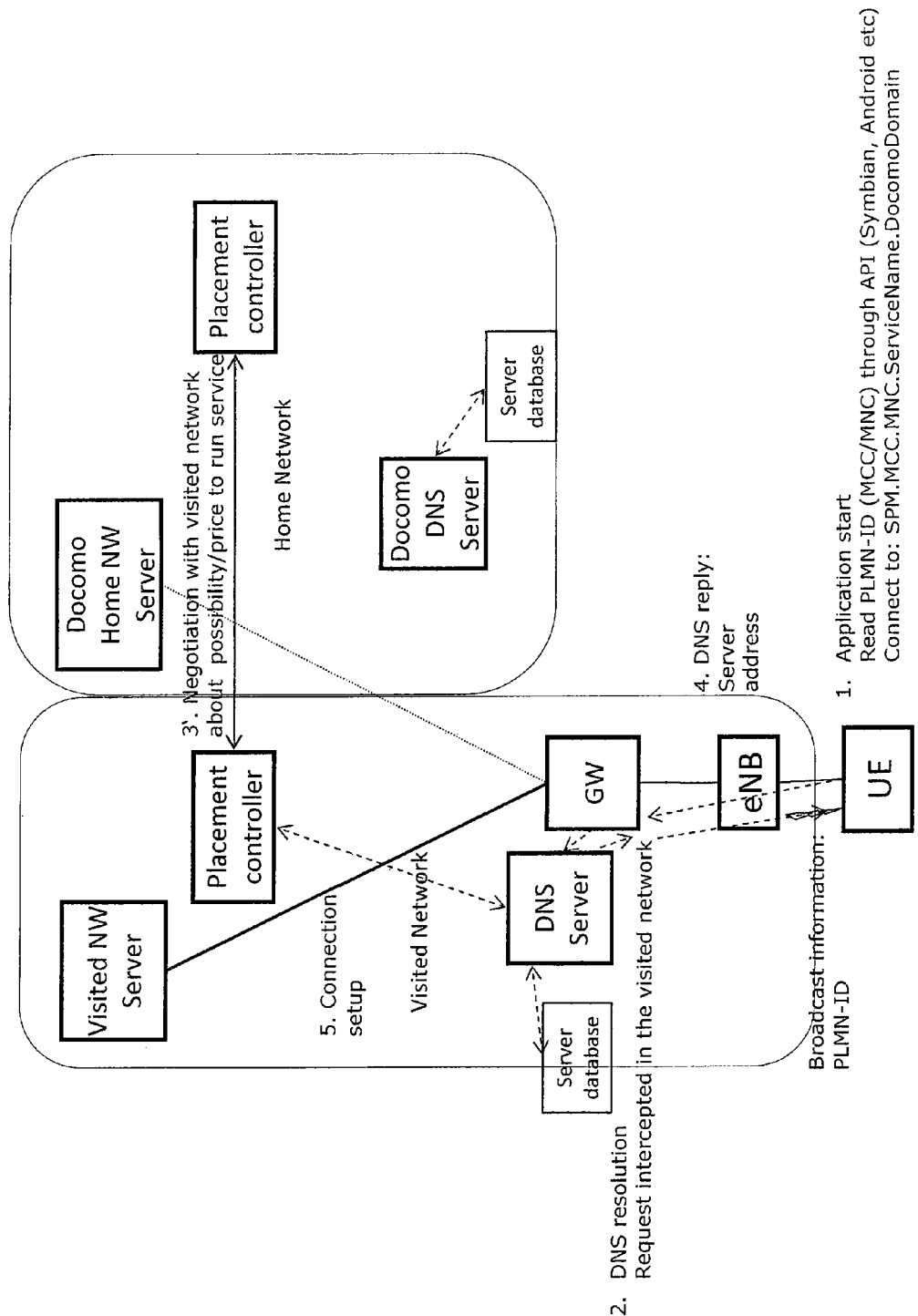
FIG. 6 schematically illustrates a redirection method according to a further embodiment of the invention.

FIG. 6 illustrates such an embodiment, how the request could be intercepted and the negotiation about service placement initiated from the visited network.

Figure 7:
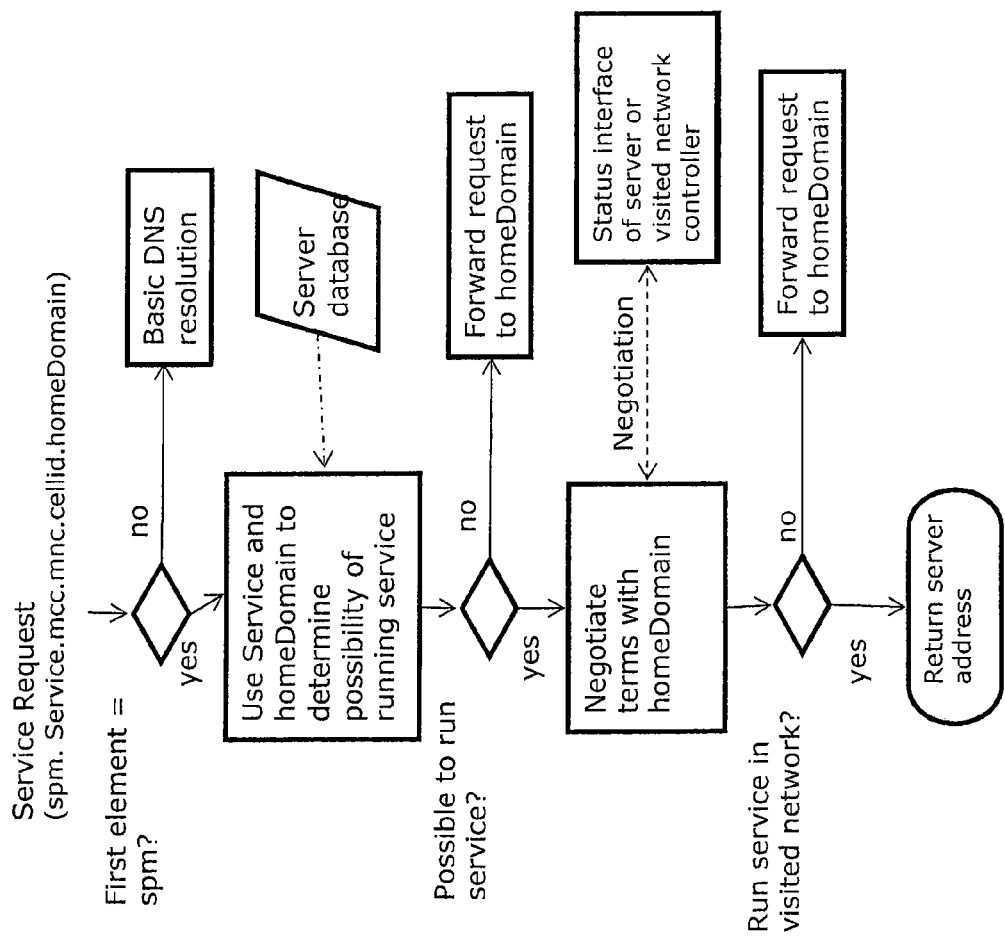
FIG. 7 schematically illustrates part of a redirection method according to a further embodiment of the invention.

Step 1 is the same as described in connection with previous embodiments. In step 2) then the DNS resolution request is intercepted in the visited network by the NDS server. The procedure implemented by the visited network DNS server is shown in FIG. 7. The interception can be triggered e.g. by the fact that the first element in the request is spm, as shown in FIG. 7. This makes the DNS server recognize that it should not forward the request to the home network but instead it intercepts it. In step 3) then investigates the possibility to run the service in the visited network, e.g. by referring to a server database as shown in FIG. 7 or by using a placement controller as shown in FIG. 6, possibly in connection with a database.

If there is no such possibility, then the request is forwarded to the home network (see FIG. 7). If, however, there is the possibility to run the service in the visited network, then the terms (e.g. price) are negotiated with the home network (e.g. between the two placement controllers of the networks) as shown in step 3' in FIG. 6 and as shown also in FIG. 7.

If the negotiation is successful, then the DNS reply is sent which contains the address of the server on which the service is to be run in the visited network (step 4)) and then in step 5) the connection is set up. Otherwise, if the negotiation is not successful, the request is forwarded to the home network.

It will be readily apparent to the skilled person that the methods, the elements, units and apparatuses described in connection with embodiments of the invention may be implemented in hardware, in software, or as a combination of both. In particular it will be appreciated that the embodiments of the invention and the elements of modules described in connection therewith may be implemented by a computer program or computer programs running on a computer or being executed by a microprocessor. Any apparatus implementing the invention may in particular take the form of a network entity such as a router, a server (particularly a DNS server), a module acting in the network, or a mobile device such as a mobile phone, a smartphone, a PDA, a UE or anything alike.

What is claimed is:

1. A method for determining a server which should respond to a service request from a mobile device, said method comprising:

Generating a DNS request which comprises a URI to identify a service requested by said mobile device and in addition to the URI of the requested service an indication of the location of the mobile device;

inserting into said DNS request a keyword, which identifies said service DNS request as being a service which is enabled for service migration;

forwarding said DNS request to a DNS server;

determining by said DNS server a most suitable server responding to said service request, said determination being based on the location of the mobile device as indicated by said indication of the location added to said URI;

returning the address of said server which has been determined based on said location to said mobile device, the method further comprising:

if said mobile device is in a visited network, forwarding said DNS request to the home network of said mobile device;

negotiating between said home network and said visited network to enable service migration from a home network server to run said service on a server in said visited network;

if said negotiation was successful, returning the address of the server in said visited network on which said requested service is running to said mobile device.

2. The method of claim 1, wherein said indication of said location is based on information being broadcast by the radio interface of the mobile network, and/or said indication of the location of the mobile device comprises the mobile country code MCC and/or the mobile network code MNC of the network and/or the cell-ID to which said mobile device is currently connected.

3. The method of claim 1, wherein based on said location indication there is chosen a server among a plurality of possible servers on which said service is running which is closer to said mobile device than other among said plurality of servers, and/or wherein based on said location indication there is chosen a server among a plurality of possible servers on which said service is running or can be run which is located in the visited network to which said mobile device is connected and not in the home network of said mobile device.

4. The method of claim 1, wherein said indication of said location of the mobile device is obtained by said mobile device and inserted into said DNS request, or said indication of said location of the mobile device is obtained by or from some entity of the network which is aware of the indication of the location of said mobile device.

5. The method of claim 4, wherein said location information is obtained by a DNS server in the network to which said mobile device is directly connected by referring to a network entity which is aware of such information, preferably the MME and/or the HSS, or the HLR and/or VLR of the network.

6. The method of claim 1, wherein said indication of the location of said mobile device is included into said DNS request as one or more subdomains of said URI identifying the requested service.

7. The method of claim 1, further comprising:

Using a server database which stores information about which server to be used depending on the location of said mobile device; and/or taking into account the loads of the available servers in addition to their location when determining the most suitable server.

8. The method of claim 1, further comprising:

Checking by a DNS server whether the DNS service request comprises a keyword or a code which identifies it as a DNS service request for which a direction based on the location of the mobile device should be attempted;

if it is determined that direction based on the location of the mobile device should be attempted, determining a suitable server which is selected based on the location of the mobile device;

returning the address of the determined server to said mobile device.

9. The method of claim 1, further comprising:
if said mobile device is in a visited network, determining by the DNS server of said visited network whether the service can be run on a server in said visited network;
if necessary, negotiating between said visited network and the home network of said mobile device the conditions for running the service in said visited network;
if the service can be run on a server in said visited network, returning the address of said server to said mobile device.

10. An apparatus for determining a server which should respond to a service request from a mobile device, said apparatus comprising:
A module for generating a DNS request which comprises a URI to identify a service requested by said mobile device and in addition to the URI of the requested service an indication of the location of the mobile device;
a module for inserting into said DNS request a keyword, which identifies said service DNS request as being a service which is enabled for service migration;
a module for forwarding said DNS request to a DNS server;
a module for determining by said DNS server a most suitable server responding to said service request, said determination being based on the location of the mobile device as indicated by said indication of the location added to said URI;
a module for returning the address of said server which has been determined based on said location to said mobile device,
said apparatus further comprising a module for,
if said mobile device is in a visited network, forwarding said DNS request to the home network of said mobile device;
negotiating between said home network and said visited network to enable service migration from a home network server to run said service on a server in said visited network;
if said negotiation was successful, returning the address of the server in said visited network on which said requested service is running to said mobile device.

11. An apparatus comprising a mobile device for operating with an apparatus according to claim 10, comprising:
A module for determining an indication of the location of said mobile device, preferably based on information broadcasted by the network to which the mobile device is connected;
a module generating a DNS request which comprises a URI to identify a service to be requested by said mobile device and in addition to the URI of the requested service an indication of the location of the mobile device.

12. An apparatus comprising a DNS server in a network for operating with an apparatus according to claim 10, comprising:
Receiving from a mobile device a DNS request which comprises a URI to identify a service to be requested by said mobile device and in addition to the URI of the requested service an indication of the location of the mobile device;
a module for determining a server based on the location of said mobile device, and
a module for returning the address of said server which has been determined based on said location to said mobile device.

13. A non-transitory computer readable medium having stored or embodied thereon computer program code comprising:
computer program code which when being executed on a computer enables said computer to carry out a method according to claim 1.

* * * * *